(12) United States Patent
Koivisto et al.

(10) Patent No.: US 8,599,960 B2
(45) Date of Patent: Dec. 3, 2013

(54) METHOD AND APPARATUS FOR MULTIPLE INPUT MULTIPLE OUTPUT DISTRIBUTED ANTENNA ARRAYS

(75) Inventors: Tommi Koivisto, Espoo (FI); Mihai Enescu, Espoo (FI); Timo Roman, Espoo (FI); Karol Schober, Helsinki (FI)

(73) Assignee: Renesas Mobile Corporation, Tokyo (JP)

( * ) Notice: Subject to any disclaimer, the term of this patent is extended or adjusted under 35 U.S.C. 154(b) by 37 days.

(21) Appl. No.: 13/246,326

(22) Filed: Sep. 27, 2011

(65) Prior Publication Data

US 2013/0077707 A1 Mar. 28, 2013

(51) Int. Cl.
 *H04L 27/00* (2006.01)
(52) U.S. Cl.
 USPC ........... 375/295; 375/299; 375/267; 375/260; 455/500; 455/101; 455/102; 455/103; 455/105
(58) Field of Classification Search
 USPC .......... 375/299, 267, 260, 295; 455/500, 101, 455/102, 103, 105
 See application file for complete search history.

(56) References Cited

U.S. PATENT DOCUMENTS

| 8,204,470 | B2 * | 6/2012 | Onggosanusi et al. | 455/329 |
|---|---|---|---|---|
| 2010/0027456 | A1 * | 2/2010 | Onggosanusi et al. | 370/312 |
| 2010/0035555 | A1 * | 2/2010 | Bala et al. | 455/63.1 |
| 2010/0239036 | A1 | 9/2010 | Koo et al. | |
| 2010/0273495 | A1 | 10/2010 | Onggosanusi et al. | |

FOREIGN PATENT DOCUMENTS

WO WO 2010/105415 A1 9/2010

OTHER PUBLICATIONS

Combined Search and Examination Report issued in connection with Great Britain Application No. GB1116623.8, dated Jan. 26, 2012.
3GPP TSG RAN WG1 #54bis; Prague, Czech Republic; Sep. 29-Oct. 3, 2008; RI-083530; Source: Texas Instruments; Title: Aspects of Coordinated Multi-point Transmission for Advanced E-UTRA; 5 pages.
3GPP TSG RAN WG1 #56; Athens, Greece, Feb. 9-13, 2009; "An Issue on Multi-Cell Antenna Allocation for Joint Approaches"; Hitachi Ltd.; RI-090598; pp. 1-5.
Combined Search Report and Examination Report from Great Britain Patent Application No. GB1211156.3 dated Sep. 5, 2012.

* cited by examiner

*Primary Examiner* — Daniel Washburn
*Assistant Examiner* — Rahel Guarino
(74) *Attorney, Agent, or Firm* — Alston & Bird LLP (57) ABSTRACT

A method, apparatus and computer program product are provided for reporting low rank feedback information for each transmission point up to a maximum rank per transmission point. In this regard, a method includes determining a transmission rank and a precoding matrix for each of at least two transmission points of a plurality of transmission points. A method also includes determining a joint transmission rank based on at least two of the plurality of transmission points. A method also includes selecting a joint transmission precoding matrix based on the determined precoding matrix for each of the at least two transmission points and the determined joint transmission rank. The method further includes causing channel state information "CSI" to be transmitted to an access point, wherein the CSI describes the selected joint transmission precoding matrix.

20 Claims, 4 Drawing Sheets

METHOD AND APPARATUS FOR MULTIPLE INPUT MULTIPLE OUTPUT DISTRIBUTED ANTENNA ARRAYS

TECHNOLOGICAL FIELD

Embodiments of the present invention relate generally to communications technology and, more particularly, to high rank multiple input multiple output "MIMO" for distributed antenna arrays.

BACKGROUND

Release 10 of the 3rd Generation Partnership Project (3GPP) Long Term Evolution (LTE) specification includes several features related to downlink (DL) and uplink (UL) MIMO, relays, bandwidth extension via carrier aggregation and enhanced inter-cell interference coordination (eICIC). In DL MIMO, in order to meet the peak spectral efficiency requirements of up to 30 bit/s/Hz, Release 10 extends Release 8/9 DL MIMO features by providing support for up to 8 stream transmissions, and hence up to 8×8 MIMO. Furthermore, enhanced support of multi-user (MU) MIMO is enabled in Release 10 and seamless switching between single- and multi-user operations is supported.

Release 10 further provides a double codebook for 8 transmit (Tx) antennas. The double codebook for 8 Tx antennas is based on a modular design (or multi-granular), combining two feedback components from distinct codebooks: one feedback component represents the long-term (e.g. wideband) radio channel properties while the other one targets the short term (e.g. frequency selective) channel properties.

Non-uniform network deployments, also known as heterogeneous networks (HetNet), are potential scenarios considered in Long Term Evolution Release 11 for DL MIMO and coordinated multi-point transmission (COMP). HetNet was considered during Release 10 within the context of enhanced inter-cell interference coordination/cancellation (eICIC) discussions, but Release 10 focused on mainly macro cell and pico cells deployed inside the macro cell, hence only relatively light interaction between the macro cells and the pico cells in the form of time-domain resource partitioning with the exchange of scheduling information and patterns over the backhaul link. One difference between the macro cell and the remote radio head (RRH) lies in the utilized transmit powers, since the macro cell may operate in the range of $^{46}/_{49}$ dBm in a 10/20 MHz carrier while the RRHs could operate for example with 30/37 dBm. The HetNet scenarios in Release 11 are considered for both coordinated multipoint transmission and for single cell MIMO enhancements. For CoMP operation, detailed simulation assumptions have been described in R1-111125, CoMP simulation assumptions, which are hereby incorporated by reference.

For example, a macro cell may consist of an array of antennas while a low power RRH may have one or an array of transmit antennas. Each antenna or array of antennas is understood to be a transmission point; hence the macro cell is a transmission point while the RRHs are also transmission points. The RRH and the macro cell are generally connected through optical fiber, hence the feedback delays and capacity over the connection are considered as ideal and unlimited in this case. The RRHs placement may be indoor or outdoor. A particular example may include an instance in which a macro cell is not present while RRHs are connected to a central unit which performs radio resource management (RRM). In a first example, it is assumed that each transmit point has its own physical cell identifier (cell ID) and in a second example it is assumed that all transmit points have the same cell ID. In both example cases there is a central unit which performs scheduling of the radio resources and is located for example at the macro cell. The RRHs, in this example, are arrays of antennas which are typically used in order to improve the spectral efficiency of the cell. Hence they can be also seen as simple radio frequency front ends pulled away from the macro cell and without RRM capability.

In the second example, where all transmit points have the same cell ID, the transmit points may be equipped with various numbers of transmit antennas. From a simulation assumption perspective 3GPP is currently assuming 2, 4 and 8 transmission points for the macro cell and 1, 2 and 4 transmission points for the low power RRHs. In the simulations being carried out in 3GPP, both co-polarized and cross-polarized types of antennas are considered with the restriction that the same type of antennas are used for all transmit points in a given configuration. However, specification-wise it is likely there will be no restriction in terms of number or type of transmit antennas, hence 8 transmission points could be considered also for RRHs.

In this example, mobile terminals are located in a cell formed by the macro cell and lie under the coverage of the RRHs. In a traditional macro cell only scenario, these mobile terminals would be configured to determine the number of transmit antennas existing at the macro cell and report the channel state information (CSI) based on the common reference symbol (CRS) or channel state information reference symbol (CSI-RS) ports. CSI-RS provides support for 1, 2 4, and 8 transmission points. CSI-RS parameters, like the periodicity and pattern, are signaled as mobile terminal-specific information. In this scenario the mobile terminal may hear the RRH (or several RRHs) and the macro cell. In such cases, the mobile terminal signals the specific antenna ports associated with the transmission points on which it performs CSI estimation. For example, if the mobile terminal hears two RRHs and the macro cell, it receives the CSI-RS patterns and parameters of these three transmit points for which to compute the CSI. Once channel estimation is performed, CSI feedback may be computed and reported to a central scheduling unit, such as the macro cell. Both single user (SU) and MU MIMO may be supported; hence the computed feedback for these three transmit points enables closed-loop MIMO operation.

However, currently mobile terminal feedback operates on a single-transmission point basis or single-cell feedback. Hence, with such feedback, the maximum supported rank in the system is limited by the maximum of the individually supported ranks for each of the transmission points. Therefore the mobile terminal would typically report the rank based on the maximum rank supported by one individual transmission point, whereas the rank could in fact be higher if more transmission points were used for transmission and considered in finding the optimal rank.

BRIEF SUMMARY

A method, apparatus and computer program product are therefore provided according to an example embodiment to provide reporting for low rank feedback information for each transmission point up to a maximum rank per transmission point. Based upon feedback information, an embodiment may enable higher rank transmission in instances in which layers for high rank transmission are provided through multiple transmission points. In one embodiment, the method, apparatus and computer program product may enable multiple transmit point higher rank transmissions even if the per transmit point partial channels do not allow sustaining transmission at full rank.

In an embodiment a method includes determining a transmission rank and a precoding matrix for each of at least two transmission points of a plurality of transmission points. A method also includes determining a joint transmission rank based on at least two of the plurality of transmission points. A method also includes selecting a joint transmission precoding matrix based on the determined precoding matrix for each of the at least two transmission points and the determined joint transmission rank. The method further includes causing CSI to be transmitted to an access point, wherein the CSI describes the selected joint transmission precoding matrix.

In another embodiment, an apparatus comprising a processor and a memory including software, with the memory and the software configured to, with the processor, cause the apparatus at least to determine a transmission rank and a precoding matrix for each of at least two transmission points of a plurality of transmission points. The apparatus is further caused to determine a joint transmission rank based on at least two of the plurality of transmission points. The apparatus is further caused to select a joint transmission precoding matrix based on the determined precoding matrix for each of the at least two transmission points and the determined joint transmission rank. A computer program product also includes program code that is further configured to cause CSI to be transmitted to an access point, wherein the CSI describes the selected joint transmission precoding matrix.

In a further embodiment, a computer program product is provided that includes at least one computer readable non-transitory memory having program code stored thereon with the program code which when executed by an apparatus causing the apparatus at least to determine a transmission rank and a precoding matrix for each of at least two transmission points of a plurality of transmission points. A computer program product also includes program code that is further configured to determine a joint transmission rank based on at least two of the plurality of transmission points. A computer program product also includes program code that is further configured to select a joint transmission precoding matrix based on the determined precoding matrix for each of the at least two transmission points and the determined joint transmission rank. A computer program product also includes program code that is further configured to cause CSI to be transmitted to an access point, wherein the CSI describes the selected joint transmission precoding matrix, In yet another embodiment, an apparatus is provided that includes means for determining a transmission rank and a precoding matrix for each of at least two transmission points of a plurality of transmission points. An apparatus further comprises means for determining a joint transmission rank based on at least two of the plurality of transmission points. An apparatus further comprises means for selecting a joint transmission precoding matrix based on the determined precoding matrix for each of the at least two transmission points and the determined joint transmission rank. An apparatus further comprises means for causing CSI to be transmitted to an access point, wherein the CSI describes the selected joint transmission precoding matrix.

In an embodiment, a method includes receiving a report comprising at least one of transmission ranks for each of the at least two transmission points, precoding matrices for each of the at least two transmission points, a joint transmission rank or a joint transmission precoding matrix. A method also includes determining a transmission strategy based on the received report. A method also includes causing a transmission using at least one of the precoding matrices for each of the at least two transmission points or the joint transmission precoding matrix.

In another embodiment, an apparatus comprising a processor and a memory including software, with the memory and the software configured to, with the processor, cause the apparatus at least to receive a report comprising at least one of transmission ranks for each of the at least two transmission points, precoding matrices for each of the at least two transmission points, a joint transmission rank or a joint transmission precoding matrix. The apparatus is further caused to determine a transmission strategy based on the received report. The apparatus is further caused to cause a transmission using at least one of the precoding matrices for each of the at least two transmission points or the joint transmission precoding matrix.

In a further embodiment, a computer program product is provided that includes at least one computer readable non-transitory memory having program code stored thereon with the program code which when executed by an apparatus causing the apparatus at least to receive a report comprising at least one of transmission ranks for each of the at least two transmission points, precoding matrices for each of the at least two transmission points, a joint transmission rank or a joint transmission precoding matrix. A computer program product also includes program code that is further configured to determine a transmission strategy based on the received report. A computer program product also includes program code that is further configured to cause a transmission using at least one of the precoding matrices for each of the at least two transmission points or the joint transmission precoding matrix.

In yet another embodiment, an apparatus is provided that includes means for receiving a report comprising at least one of transmission ranks for each of the at least two transmission points, precoding matrices for each of the at least two transmission points, a joint transmission rank or a joint transmission precoding matrix. An apparatus further comprises means for determining a transmission strategy based on the received report. An apparatus further comprises means for causing a transmission using at least one of the precoding matrices for each of the at least two transmission points or the joint transmission precoding matrix.

BRIEF DESCRIPTION OF THE DRAWINGS

Having thus described the example embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product of an example embodiment of the present invention are configured to enable a mobile terminal to exploit low rank feedback for higher rank transmissions by diagonalizing or semi-diagonalizing reported per cell feedback received from multiple points. In example embodiments, diagonalization and/or semi-diagonalization of per-cell feedback allows for higher rank transmission for SU-MIMO.

In an embodiment, assuming a total number K transmission points, a joint precoding matrix W for low transmission rank R may be used for all transmission points and is formed as:

$$W = \begin{bmatrix} W^1 \\ W^2 \\ \vdots \\ W^K \end{bmatrix}$$

where the precoder W is of dimension $$\left(\sum_{k=1}^{K} N_t^k\right) \times R$$

and each matrix $W^k$, $k=1, \ldots, K$ is of dimension $N_t^k \times R$, with $N_t^k$ being the number of transmit antennas at the k-th transmission point and R being a transmission rank common to all K transmission points. In an embodiment, the rank R fulfills the relationship $$R \leq \max_{k=1,\ldots,K} R_k,$$

where $R_k$ is the reported rank for the k-th transmission point.

In an embodiment, the matrices $W^k$, $k=1, \ldots, K$, are configured to contain a codeword/precoder specific to the k-th transmission point, intra-transmission point precoders and/or inter-transmission point amplitude/phase combiners. For example, for rank 1, each of the precoders $W^k$ can be expressed as $W^k = c_k \overline{W}^k$ where $c_k$ is the inter-transmission point amplitude/phase combiner (a complex-valued scalar) and $\overline{W}^k$ is the intra-transmission point precoder. In an embodiment, intra-transmission point precoders are configured to target separate transmissions from each transmission point. Inter-transmission point combiners are further configured to support joint transmission from the K transmission points to the mobile terminal. For example, an intra-transmission point precoder can be selected from a single codebook e.g. like 2-Tx and 4-Tx 3GPP LTE Rel-8 codebooks or from a double codebook e.g. like 3GPP LTE Rel-10 codebook for 8-transmission points, all of which are hereby incorporated by reference. Alternatively or additionally, the inter-transmission point combiners may be used to coherently combine the precoders associated with each of the K transmission points in order to obtain a resulting precoder W. For example, inter-transmission point combiners target coherent combining between the beams of each transmission point formed by above described intra-transmission point precoders. Alternatively or additionally, the inter-transmission point combiners may comprise an amplitude term, which may improve performance in cases in which beams from different transmission points are received with substantial power imbalance.

In an embodiment, assuming that k-th transmission point may comprise $N_t^k$ transmit antennas, $k=1, \ldots, K$, and a mobile terminal is equipped with $N_r$ receive antennas, and in an instance in which $N_t^k < N_r$, the k-th transmission point may therefore transmit at most $N_t^k$ layers at the time. Alternatively or additionally, in an instance in which a transmission is carried simultaneously from K transmission points, the associated joint transmission channel is of dimension $$N_r \times \sum_{k=1}^{K} N_t^k$$

and thus for example allows for transmission up to $$\min\left(N_r, \sum_{k=1}^{K} N_t^k\right)$$

layers at the time. However, in some embodiments, mobile terminal feedback is provided on a per transmission point basis of rank $R_k \leq N_t^k$ for the k-th transmission point. Alternatively or additionally, in a configuration where the K transmission points simultaneously transmit to a mobile terminal, there is potential for a total transmission rank $R_T$ such that $$R_T \leq \min\left(N_r, \sum_{k=1}^{K} N_t^k\right).$$

Figure 1:
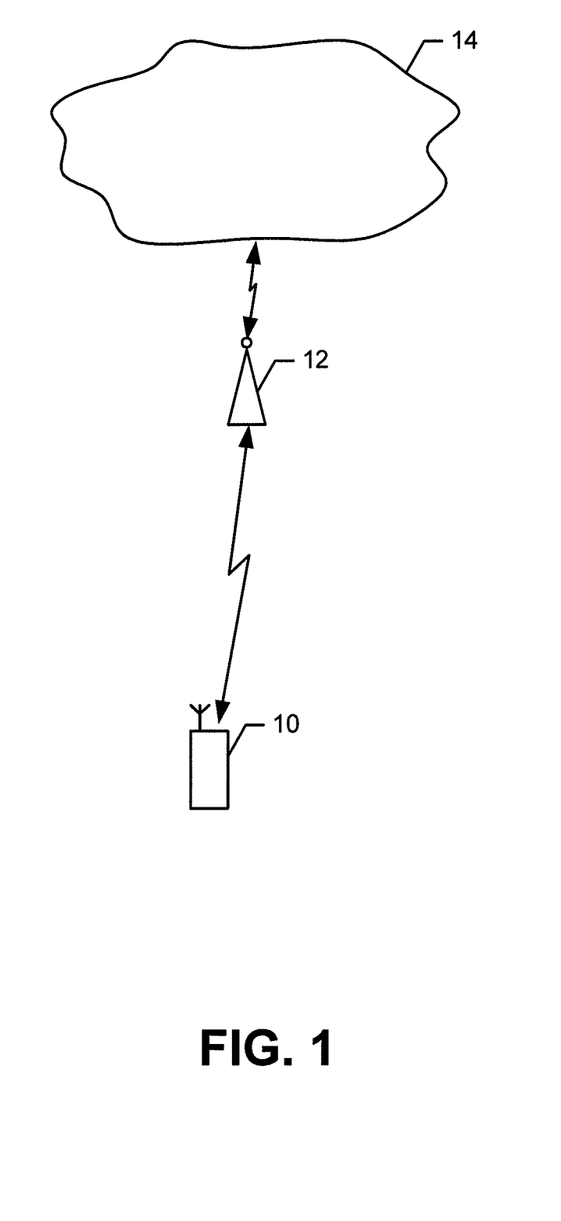
FIG. 1 is a schematic representation of a system having a mobile terminal that may provide feedback and that may benefit from an embodiment of the present invention.

Although the method, apparatus and computer program product may be implemented in a variety of different systems, one example of such a system is shown in FIG. 1, which includes a first communication device (e.g., mobile terminal 10) that is capable of communication via an access point 12, such as a base station, a macro cell, a Node B, an evolved Node B (eNB), a coordination unit, a macro base station or other access point, with a network 14 (e.g., a core network). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including access point 12 and which may serve a respective coverage area. The access point could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE)), may be in communication with other communication devices or other devices via the access point 12 and, in turn, the network 14. In some cases, the communication device may include an antenna for transmitting signals to and for receiving signals from an access point.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

Figure 2:
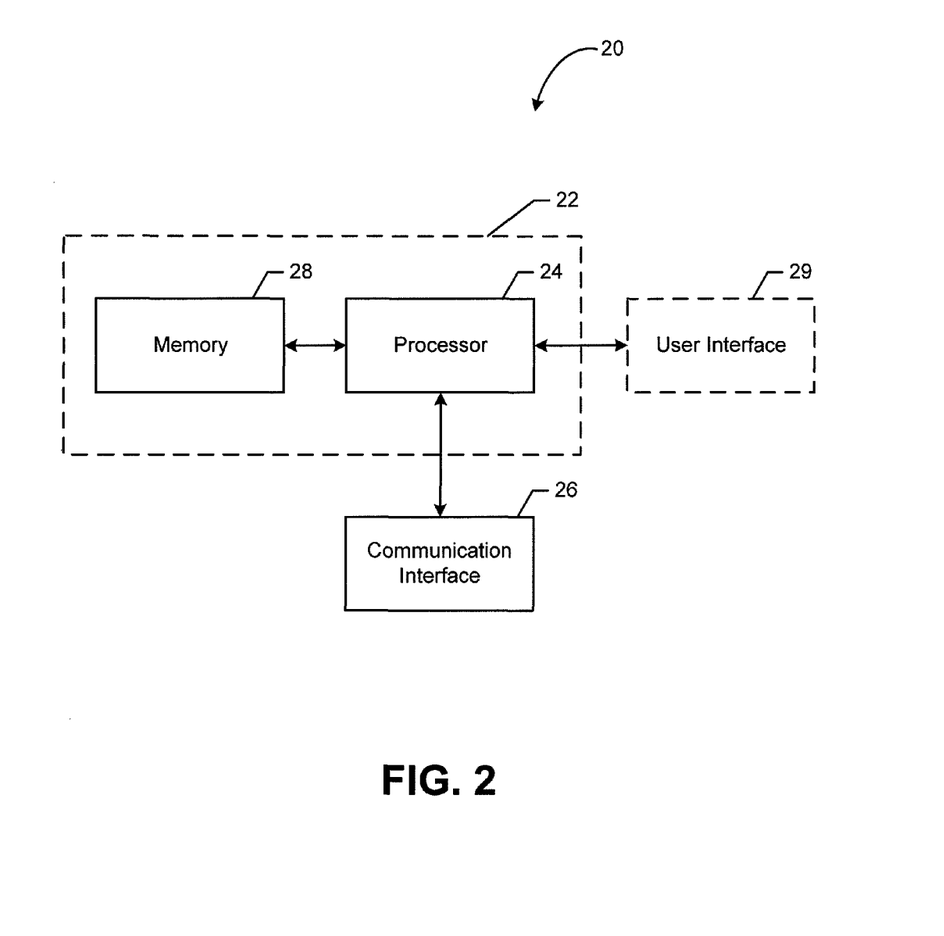
FIG. 2 is a block diagram of an apparatus that may be embodied by a mobile terminal in accordance with one embodiment of the present invention.

In one embodiment, for example, the mobile terminal 10 and/or the access point 12 may be embodied as or otherwise include an apparatus 20 as generically represented by the block diagram of FIG. 2. While the apparatus 20 may be employed, for example, by a mobile terminal 10 or an access point 12, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 29. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 29 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as an access point 12, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the access point 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

A method, apparatus and computer program product of an example embodiment of the present invention is configured to enable the apparatus 20 embodied, for example, by a mobile terminal 10, that may include means, such as the processing circuitry 22, the processor 24, communications interface 26 or the like, to report ranks up to $R_T$, thus advantageously providing the example mobile terminal with the ability to exploit low rank feedback for higher rank transmission by diagonalizing or semi-diagonalizing the reported per point feedback consisting of $W^k$ matrices. For example the reported per point feedback matrices $W^k$, k=1, . . . K, may be diagonalized:

$$W = \begin{bmatrix} W^1 & 0 & 0 & 0 \\ 0 & W^2 & 0 & 0 \\ 0 & 0 & \ddots & 0 \\ 0 & 0 & 0 & W^K \end{bmatrix},$$

where, in one embodiment, each sub-matrix $W^k$ is of dimension $N_t^k \times R_k$ and the matrix W is thus of dimension $$\left(\sum_{k=1}^{K} N_t^k\right) \times R_T \text{ with } R_T = \sum_{k=1}^{K} R_k.$$

In an embodiment, a joint transmission precoding matrix may be diagonalized such that each of its associated spatial layers is transmitted by one of the K transmission points.

In an embodiment, each transmit point may contribute by $R_k$ to the total transmission rank $R_T$, in other words different layers for higher ranks are transmitted from different transmission points. For example the reported per point feedback matrices $W^k$, k=1, . . . K, may be semi-diagonalized:

$$W = \begin{bmatrix} W^1 & 0 & 0 \\ W^2 & 0 & 0 \\ 0 & \ddots & 0 \\ 0 & 0 & W^K \end{bmatrix},$$

where, in one embodiment, the matrix W is of size $$\left(\sum_{k=1}^{K} N_t^k\right) \times R_T, \ R_T = R_{1,2} + \sum_{k=3}^{K} R_k$$

with $R_{1,2}$ being the transmission rank over the first two transmission points. In an embodiment, a joint transmission precoding matrix may be semi-diagonalized such that at least one of its associated spatial layers is transmitted by one of the K transmission points and at least another one of its associated layers is transmitted jointly by at least two of the K transmission points.

For example, the first two transmit points (indexed by k=1, 2) may be configured to perform joint transmission and contribute to the total rank $R_T$ with a contribution equal to $R_{1,2}$ while each of remaining transmit points (indexed by k=3, . . . , K) may contribute to the total rank with a contribution equal to $R_k$. Alternatively or additionally, an optimal rank $R_{opt}$ (with either diagonalization/semi-diagonalization) may be selected to maximize the a performance metric, such as throughput, of the communication system. For example, ranks between $$R \leq \max_{k=1,\ldots,K} R_k \text{ and } R_T \leq \min\left(N_r, \sum_{k=1}^{K} N_t^k\right)$$

may be handled by taking a subset of columns from full matrix W, for example the first $R_{opt}$ columns in an instance in which the transmission points are ordered according to for example received power in W.

In an example considering K=3 transmission points, a first macro cell that comprises $N_t^1$=4 transmit antennas, a second and third RRH that each comprise $N_t^2$=2, $N_t^3$=2 transmit antennas, assuming that per transmission point ranks are $R_1$=2, $R_2$=2, $R_3$=1 and the number of receive antennas at the mobile terminal is $N_r$=4; a mobile terminal is configured to support transmission ranks 1-4 in downlink.

By way of further example, reported feedback may be a maximum rank feedback per point and may include one or more corresponding combiners, and is the following:

$$W = \begin{bmatrix} \overline{W}_{N_t^1 \times R_1^1} \\ \overline{W}_{N_t^2 \times R_2^2} C_2 \\ \overline{W}_{N_t^3 \times R_3^3} C_3 \end{bmatrix},$$

where $\overline{W}_{N_t^k \times R}{}^k$ is the k-th transmission point reported codeword from an associated codebook, $$C_k = \begin{bmatrix} c_k^{(1,1)} & 0 \\ 0 & c_k^{(2,2)} \end{bmatrix}$$

is an inter-cell combiner diagonal matrix and $R_k$ is the transmission rank corresponding to the k-th transmission point. By way of further example, the k-th transmission points contributes by $R_k$ to the overall transmission rank which is the sum of $R_k$, k=1, ..., K. The received reported per point feedback may be used for joint transmission in an embodiment with Rank=1:

$$W_{8 \times 1} = \begin{bmatrix} \overline{W}_{4 \times 2}^1(:,1) \\ \overline{W}_{2 \times 2}^2(:,1) c_2^{(1,1)} \\ \overline{W}_{2 \times 1}^3 c_3^{(1,1)} \end{bmatrix},$$

descriptive feedback contruction according to a matrix $$\begin{bmatrix} 1 & 0 & 0 & 0 \\ 1 & 0 & 0 & 0 \\ 1 & 0 & 0 & 0 \end{bmatrix}$$

where the joint transmission layers are defined along the horizontal axis and the transmission points are defined along the vertical axis.

Rank=2:

$$W_{8 \times 2} = \begin{bmatrix} \overline{W}_{4 \times 2}^1 \\ \overline{W}_{2 \times 2}^2 \begin{bmatrix} c_2^{(1,1)} & 0 \\ 0 & c_2^{(2,2)} \end{bmatrix} \\ \begin{bmatrix} \overline{W}_{2 \times 1}^3 & 0_{2 \times 1} \end{bmatrix} \begin{bmatrix} c_3^{(1,1)} & 0 \\ 0 & 0 \end{bmatrix} \end{bmatrix},$$

descriptive feedback contruction according to:

$$\begin{bmatrix} 1 & 2 & 0 & 0 \\ 1 & 2 & 0 & 0 \\ 1 & 0 & 0 & 0 \end{bmatrix}$$

Rank=3:

$$W_{8 \times 3} = \begin{bmatrix} \overline{W}_{4 \times 2}^1 & 0 \\ \overline{W}_{2 \times 2}^2 \begin{bmatrix} c_2^{(1,1)} & 0 \\ 0 & c_2^{(2,2)} \end{bmatrix} & 0 \\ 0 & \overline{W}_{2 \times 1}^3 \end{bmatrix},$$

descriptive feedback contruction according to $$\begin{bmatrix} 1 & 2 & 0 & 0 \\ 1 & 2 & 0 & 0 \\ 0 & 0 & 1 & 0 \end{bmatrix}$$

Rank=4:

$$W_{8 \times 4} = \begin{bmatrix} \overline{W}_{4 \times 2}^1 & 0 \\ 0 & \overline{W}_{2 \times 2}^2 \\ 0 & \begin{bmatrix} \overline{W}_{2 \times 1}^3 & 0_{2 \times 1} \end{bmatrix} \begin{bmatrix} c_1^{(1,1)} & 0 \\ 0 & 0 \end{bmatrix} \end{bmatrix}$$ "semi-diagonalization"

descriptive feedback contruction according to:

$$\begin{bmatrix} 1 & 2 & 0 & 0 \\ 0 & 0 & 1 & 2 \\ 0 & 0 & 1 & 0 \end{bmatrix}$$

The multi-point feedback matrices are constructed based on the per point precoders and appropriate combiners. The degree of diagonalization of these per point combiners in the final multi-point feedback depends on the achievable throughput.

By way of an additional example, in which K=2 transmission points, a first example transmission point includes a macro cell comprising $N_t^1$=4 transmit antennas, a second transmission point includes an example RRH comprising $N_t^2$=2 transmit antennas, assuming that per transmission point ranks are $R_1$=2, $R_2$=2 and the number of receive antennas at the mobile terminal is $N_r$=4; the example mobile terminal is configured to support transmission ranks 1-4 in downlink. Alternatively or additionally, reported feedback may include maximum rank feedback per transmission point and corresponding combiners, and may include the following:

$$W = \begin{bmatrix} \overline{W}_{N_t^1 \times R_1}^1 \\ \overline{W}_{N_t^2 \times R_2}^2 C_2 \end{bmatrix},$$

where $\overline{W}_{N_t^k \times R^k}^k$ the k-th transmission point reported codeword from an associated codebook, $$C_k = \begin{bmatrix} c_k^{(1,1)} & 0 \\ 0 & c_k^{(2,2)} \end{bmatrix}$$

is an inter-cell combiner diagonal matrix and $R_k$ is the transmission rank corresponding to the k-th transmission point. For example, the k-th transmission points contributes by $R_k$ to the overall transmission rank which is the sum of $R_k$, k=1, ..., K. The received reported feedback can be used for joint transmission with Rank=1:

$$W_{6\times1} = \begin{bmatrix} \overline{W}^1_{4\times2}(:,1) \\ \overline{W}^2_{2\times2}(:,1)c_2^{(1,1)} \end{bmatrix}$$

Rank=2:

$$W_{6\times2} = \begin{bmatrix} \overline{W}^1_{4\times2} \\ \overline{W}^2_{2\times2}\begin{bmatrix} c_2^{(1,1)} & 0 \\ 0 & c_2^{(2,2)} \end{bmatrix} \end{bmatrix}$$

$$W_{6\times2} = \begin{bmatrix} \overline{W}^1_{4\times2} \\ \begin{bmatrix} \overline{W}^2_{2\times2}(:,2) & \overline{W}^2_{2\times2}(:,1) \end{bmatrix}\begin{bmatrix} c_2^{(2,2)} & 0 \\ 0 & c_2^{(1,1)} \end{bmatrix} \end{bmatrix}$$ "layer permutation"

descriptive feedback construction according to:

$$\begin{bmatrix} 1 & 2 \\ 2 & 1 \end{bmatrix}$$

Rank=3:

$$W_{6\times3} = \begin{bmatrix} \overline{W}^1_{4\times2} & 0 \\ 0 & \overline{W}^2_{2\times2}(:,1) \end{bmatrix}$$

Rank=4:

$$W_{6\times4} = \begin{bmatrix} \overline{W}^1_{4\times2} & 0 \\ 0 & \overline{W}^2_{2\times2} \end{bmatrix}$$ "full diagonalization"

In alternate embodiments, there may be multiple possibilities on how the per transmission point precoders are arranged for higher ranks, and the mobile terminal may alternatively or additionally report the index of the chosen matrix arrangement with additional required combiners as part of the feedback. The embodiments described herein may also be used with any joint feedback containing per point feedbacks and combiners. Alternatively or additionally, the per point feedback as well as combiner may be a codeword from a codebook.

Figure 3:
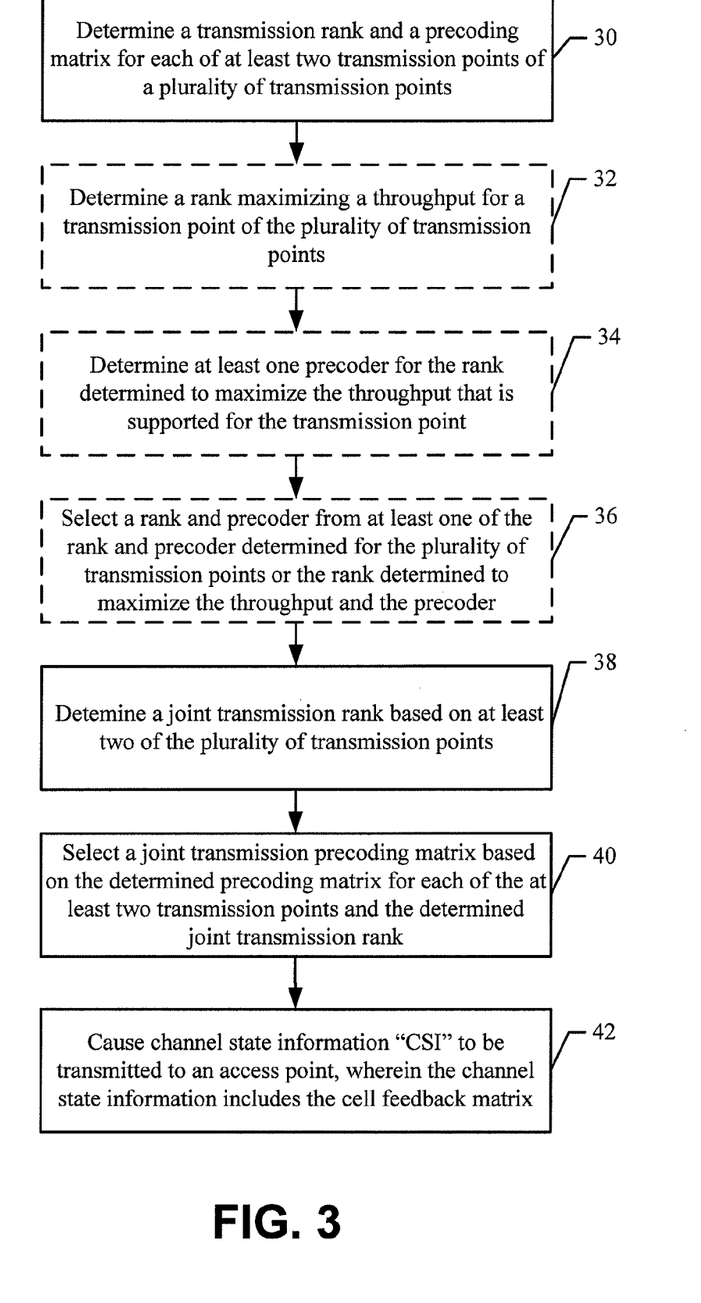
FIG. 3 is a flow chart illustrating operations performed by an example mobile terminal in accordance with one embodiment of the present invention.
Figure 4:
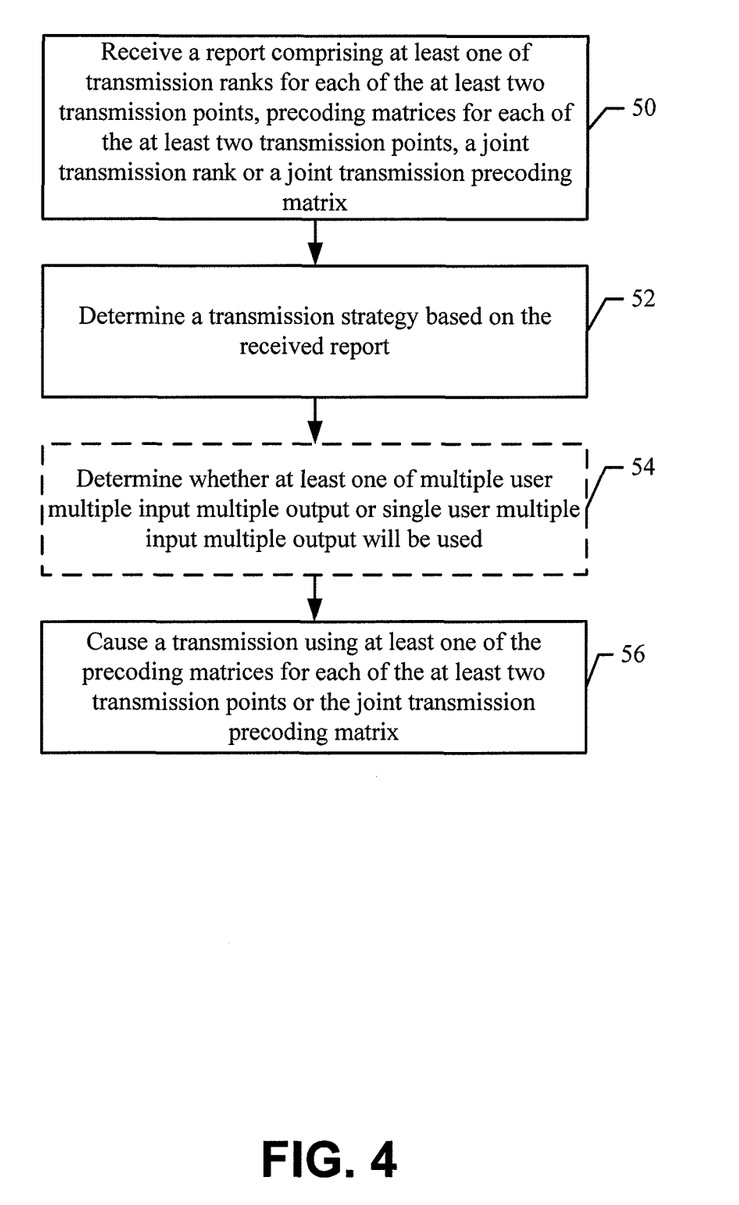
FIG. 4 is a flow chart illustrating operations performed by an example access point in accordance with one embodiment of the present invention.

FIGS. 3 and 4 illustrate example operations performed by a method, apparatus and computer program product, such as apparatus 20 of FIG. 2 in accordance with one embodiment of the present invention are illustrated. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 and 4, when executed, convert a computer or processing circuitry into a particular machine configured to perform an example embodiment of the present invention. Accordingly, the operations of FIGS. 3 and 4 define an algorithm for configuring a computer or processing circuitry 22, e.g., processor, to perform an example embodiment. In some cases, a general purpose computer may be provided with an instance of the processor which performs the algorithm of FIGS. 3 and 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included (some examples of which are shown in dashed lines in FIG. 3). It should be appreciated that each of the modifications, optional additions or amplifications below may be included with the operations above either alone or in combination with any others among the features described herein.

FIG. 3 is a flow chart illustrating mobile terminal feedback performed in accordance with one embodiment of the present invention. In an embodiment, the apparatus 20 embodied, for example, by a mobile terminal 10, may include means, such as the processing circuitry 22, the processor 24 or the like, for estimating a MIMO channel corresponding to each transmit point. In embodiments using LTE, a MIMO channel may be estimated from CSI-RS.

Referring now to FIG. 3, as shown in operation 30, the apparatus 20 embodied, for example, by a mobile terminal 10, may include means, such as the processing circuitry 22, the processor 24 or the like, for determining a transmission rank and a precoding matrix for each of at least two transmission points of a plurality of transmission points. In an embodiment, for each transmit point k=1, ..., K, the mobile terminal may be configured to compute an optimum rank $R_{k,opt}$ and a corresponding optimum precoder $\overline{W}_{N_t^k \times R_{k,opt}}^k$. These are computed, for example using means such as the processing circuitry 22, the processor 24 or the like, by sampling each of the possible matrices in a (specified) codebook for each rank, computing a selected performance metric such as the throughput and selecting the rank-precoder combination. For example a rank-precoder combination may be chosen that maximizes throughput.

In an embodiment, based on the computed precoders $\overline{W}_{N_t^k \times R}^k$ for each transmit point, the apparatus 20 embodied, for example, by a mobile terminal 10, may include means, such as the processing circuitry 22, the processor 24 or the like, for computing combiners $C_k$, for example, by sampling each of the possible combiners in the codebook and forming a joint precoder, such as:

$$W = \begin{bmatrix} W^1 \\ W^2 \\ \vdots \\ W^K \end{bmatrix}$$

where $W^k = \overline{W}^k C_k$. In an embodiment, a combiner may be chosen that maximizes the joint transmission throughput.

In an embodiment, once transmission point-specific precoders $W^k$ have been selected, the apparatus 20 embodied, for example, by a mobile terminal 10, may include means, such as the processing circuitry 22, the processor 24 or the like, that may be configured to compute a higher rank optimum per-point feedback arrangement in an instance in which the maximum rank supported by a distributed antenna system is higher than a chosen per-transmission point rank. As shown in operation 32, the apparatus 20 embodied, for example, by a mobile terminal 10, may include means, such as the processing circuitry 22, the processor 24 or the like, for determining at least one rank and at least one precoder for a plurality of transmission points. In an embodiment, each rank from the transmission point-specific rank $R_{k,opt}$ to the maximum supported rank $$R_T \leq \min\left(N_r, \sum_{k=1}^{K} N_t^k\right),$$

may be analyzed, such as by the processor 24.

As shown in operation 34, the apparatus 20 embodied, for example, by a mobile terminal 10, may include means, such as the processing circuitry 22, the processor 24 or the like, for determining at least one precoder for a determined a maximizing rank supported for a transmission point. In an embodiment, for each rank a corresponding precoder or precoders, as described herein, is formed by diagonalizing or semi-diagonalizing the full matrix W.

As shown in operation 36, the apparatus 20 embodied, for example, by a mobile terminal 10, may include means, such as the processing circuitry 22, the processor 24 or the like, for selecting a rank and precoder from at least one of the determined rank and precoder or the determined maximizing rank and precoder. In an embodiment, the apparatus 20 embodied, for example, by a mobile terminal 10, may include means, such as the processing circuitry 22, the processor 24 or the like, for determining a rank-precoder combination (feedback arrangement), such as a rank-precoder combination that maximizes throughput.

As shown in operation 38, the apparatus 20 embodied, for example, by a mobile terminal 10, may include means, such as the processing circuitry 22, the processor 24 or the like, for determining a joint transmission rank based on at least two of the plurality of transmission points. In an embodiment, a joint transmission rank is determined under the assumption that joint transmission would occur as determined by the mobile terminal. As shown in operation 40, the apparatus 4 embodied, for example, by a mobile terminal 10, may include means, such as the processing circuitry 22, the processor 24 or the like, for generating a joint transmission precoding matrix based on the determined precoding matrix for each of the at least two transmission points and the determined joint transmission rank. In an embodiment, the precoder may be fixed for each rank or there may be alternate ways of arranging (diagonalizing/semi-diagonalizing) the precoders into a joint transmission precoding matrix, such as W.

As shown in operation 42, the apparatus 20 embodied, for example, by a mobile terminal 10, may include means, such as the processing circuitry 22, the processor 24, the communications interface 26 or the like, for causing channel state information "CSI" to be transmitted to an access point. The CSI may include the joint transmission precoding matrix, an index, and/or a pointer to the joint transmission precoding matrix. CSI feedback may, for example, include means and/or signaling that describes a joint transmission precoding matrix in a manner such that a mobile terminal, an access point, or the like may receive and/or access an unambiguous description of the joint transmission precoding matrix.

In an embodiment, transmission point-specific matrices with or without combiner, e.g., $\overline{W}^k$ or $W^k$ respectively, along with the corresponding rank may be included with the transmitted CSI. Furthermore, in an embodiment, at least one transmission point-specific rank indicator is reported. Multiple indicators may be reported in an instance in which the same rank is not assumed for all transmission points. Alternatively or additionally, the apparatus 20 embodied, for example, by a mobile terminal 10, may include means, such as the processing circuitry 22, the processor 24, the communications interface 26 or the like, for causing the optimum total rank which corresponds to the at least semi-diagonalized precoding matrix to be reported.

Alternatively or additionally, the apparatus 20 embodied, for example, by a mobile terminal 10, may include means, such as the processing circuitry 22, the processor 24, the communications interface 26 or the like, for causing an index to be reported corresponding to one of multiple possible matrix arrangements, e.g. an index to a codebook of different alternatives to (semi-) diagonalize the matrix W.

Alternatively or additionally, the apparatus 20 embodied, for example, by a mobile terminal 10, may include means, such as the processing circuitry 22, the processor 24, the communications interface 26 or the like, for causing CQIs to be reported corresponding to a transmission with at least one transmission point-specific precoder, CQI(s) corresponding to low rank $R_{k,opt}$ joint transmission from all transmission points, and/or CQI(s) corresponding to high rank $R_{opt}$ joint transmission from all transmission points. Alternatively or additionally, the CQI may be wideband, e.g. only one value is reported for the whole band for each quantity, or sub band, e.g. multiple values may be reported for at least a portion of the quantities.

As shown in operation 50 of FIG. 4, the apparatus 20 embodied, for example, by an access point 12, may include means, such as the processing circuitry 22, the processor 24, the communications interface 26 or the like, for receiving a report comprising at least one of transmission ranks for each of the at least two transmission points, precoding matrices for each of the at least two transmission points, a joint transmission rank or a joint transmission precoding matrix. The report, such as a CSI report is further explained with reference to operation 42 of FIG. 3.

As shown in operation 52, the apparatus 20 embodied, for example, by an access point 12, may include means, such as the processing circuitry 22, the processor 24 or the like, for determining a transmission strategy based on the received report. For example, the apparatus 20 embodied, for example, by an access point 12, may include means, such as the processing circuitry 22, the processor 24 or the like, for comparing resulting estimated per-point transmission throughput to joint transmission throughput to determine an optimum transmission strategy.

The apparatus 20 embodied, for example, by an access point 12, may include means, such as the processing circuitry 22, the processor 24 or the like, for determining corresponding antenna weights based on the received index of transmission point specific precoders and the index of the high rank precoder. Alternatively or additionally the apparatus 20 embodied, for example, by an access point 12, may include means, such as the processing circuitry 22, the processor 24 or the like, for arranging a full precoding matrix W for the high rank precoder.

As shown in operation 54, the apparatus 20 embodied, for example, by an access point 12, may include means, such as the processing circuitry 22, the processor 24 or the like, for determining whether SU-MIMO will be used. In an embodiment, the apparatus 20 embodied, for example, by an access point 12, may include means, such as the processing circuitry 22, the processor 24 or the like, for determining a transmission rank based on a received CSI report and in some embodiments on scheduling decisions.

For example, the apparatus 20 embodied, for example, by an access point 12, may include means, such as the processing circuitry 22, the processor 24 or the like, for determining whether MU-MIMO should be utilized. An example access point may utilize the lower reported rank or another lower rank. In an instance in which the apparatus 20 is embodied, for example, by an access point 12, determines that SU-MIMO should be utilized, such as by the processor 24, the access point 12, may utilize the high reported rank.

As shown in operation 56, the apparatus 20 embodied, for example, by an access point 12, may include means, such as the processing circuitry 22, the processor 24, the communications interface 26 or the like, for causing a transmission using at least one of the precoding matrices for each of the at least two transmission points or the joint transmission precoding matrix. In an embodiment at least one of data (e.g. PDCCH) and/or control (e.g. PDCCH) to be transmitted. The transmission may be based on the determined antenna weights. In an embodiment, the apparatus 20 embodied, for example, by an access point 12, may include means, such as the processing circuitry 22, the processor 24, the communications interface 26 or the like, for causing data/control to be transmitted to a mobile terminal utilizing the determined antenna weights.

Advantageously, the apparatus 20, method and computer program product as described herein enables flexible SU MIMO/MU MIMO operation using a diagonalizing (semi-diagonalizing) technique. In a MU MIMO operation embodiment, a low rank of the precoding matrix can be readily available in the form of $W_{8\times1}$, or $W_{8\times2}$ (resp. $W_{6\times1}$, or $W_{6\times2}$) above. In a high rank SU MIMO operation embodiment, the diagonalizing (semi-diagonalizing) method may be used to obtain higher rank precoders in the form of $W_{8\times3}$, or $W_{8\times4}$ (resp. $W_{6\times3}$, or $W_{6\times4}$). Alternatively or additionally the apparatus 20, method and computer program product as described herein provides support for dynamic SU/MU operation with, for example, little additional complexity.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining a transmission rank and a precoding matrix for each of at least two transmission points of a plurality of transmission points;
   determining a joint transmission rank based on at least two of the plurality of transmission points;
   selecting a joint transmission precoding matrix from a plurality of candidate joint transmission precoding matrices generated from the determined precoding matrix for each of the at least two transmission points and the determined joint transmission rank; and
   causing channel state information "CSI" to be transmitted to an access point, wherein the CSI describes the selected joint transmission precoding matrix.

2. The method of claim 1 further comprises causing at least one of the determined transmission ranks for each of the at least two transmission points, the determined precoding matrices for each of the at least two transmission points, the determined joint transmission rank or the selected joint transmission precoding matrix to be transmitted to the access point.

3. The method of claim 1, wherein the joint transmission precoding matrix is diagonalized such that each of its associated spatial layers is transmitted by a transmission point of the plurality of transmission points.

4. The method of claim 1, wherein the joint transmission precoding matrix is semi-diagonalized such that at least one of an associated spatial layers is transmitted by a transmission point of the plurality of transmission points and at least another associated spatial layer is transmitted jointly by at least two transmission points of the plurality of transmission points.

5. The method of claim 1, wherein the joint transmission precoding matrix is formed based on a column permutation of the determined precoding matrices for at least one of the at least two transmission points.

6. The method of claim 1, wherein the joint transmission precoding matrix comprises sub-matrices based on the determined precoding matrices for each of the at least two transmission points.

7. The method of claim 1, wherein the determined precoding matrices for each of the at least two transmission points comprises an intra-transmission point precoder and an inter-transmission point combiner.

8. The method of claim 1, wherein determining precoding matrices for each of the at least two transmission points further comprises determining a precoding matrix that is configured to optimize a performance metric.

9. The method of claim 1, wherein selecting a joint transmission precoding matrix further comprises:
  generating at least one of a plurality of candidate joint transmission precoding matrices, each of the generated plurality of candidate joint transmission precoding matrices being based on the determined precoding matrix for each of the at least two transmission points and the determined joint transmission rank;
  selecting a generated candidate joint transmission precoding matrix from the plurality of generated candidate joint transmission precoding matrices based on a performance metric.

10. An apparatus comprising:
a processor and
a memory including software, the memory and the software configured to, with the processor, cause the apparatus to at least:
  determine a transmission rank and a precoding matrix for each of at least two transmission points of a plurality of transmission points;
  determine a joint transmission rank from a plurality of candidate joint transmission precoding matrices generated from at least two of the plurality of transmission points;
  select a joint transmission precoding matrix based on the determined precoding matrix for each of the at least two transmission points and the determined joint transmission rank; and
  cause channel state information "CSI" to be transmitted to an access point, wherein the CSI describes the selected joint transmission precoding matrix.

11. The apparatus of claim 10 wherein the at least one memory including the computer program code is further configured to, with the at least one processor, cause the apparatus to cause at least one of the determined transmission ranks for each of the at least two transmission points, the determined precoding matrices for each of the at least two transmission points, the determined joint transmission rank or the selected joint transmission precoding matrix to be transmitted.

12. The apparatus of claim 10, wherein the joint transmission precoding matrix is diagonalized such that each of its associated spatial layers is transmitted by a transmission point of the plurality of transmission points.

13. The apparatus of claim 10, wherein the joint transmission precoding matrix is semi-diagonalized such that at least one of an associated spatial layers is transmitted by a transmission point of the plurality of transmission points and at least another associated spatial layer is transmitted jointly by at least two transmission points of the plurality of transmission points.

14. The apparatus of claim 10, wherein the joint transmission precoding matrix is formed based on a column permutation of the determined precoding matrices for at least one of the at least two transmission points.

15. The apparatus of claim 10, wherein the joint transmission precoding matrix comprises sub-matrices based on the determined precoding matrices for each of the at least two transmission points.

16. The apparatus of claim 10, wherein the determined precoding matrices for each of the at least two transmission points comprises an intra-transmission point precoder and an inter-transmission point combiner.

17. The method of claim 10, wherein determining precoding matrices for each of the at least two transmission points further comprises determining a precoding matrix that is configured to optimize a performance metric.

18. The apparatus of claim 10, wherein the at least one memory including the computer program code is further configured to, with the at least one processor, cause the apparatus to:
  generate at least one of a plurality of candidate joint transmission precoding matrices, each of the generated plurality of candidate joint transmission precoding matrices being based on the determined precoding matrix for each of the at least two transmission points and the determined joint transmission rank;
  select a generated candidate joint transmission precoding matrix from the plurality of generated candidate joint transmission precoding matrices based on a performance metric.

19. An apparatus comprising:
a processor and
a memory including software, the memory and the software configured to, with the processor, cause the apparatus to at least:
  receive a report comprising at least one of transmission ranks for each of the at least two transmission points, precoding matrices for each of the at least two transmission points, a joint transmission rank or a joint transmission precoding matrix, wherein the joint transmission precoding matrix is selected by a mobile terminal from a plurality of generated candidate joint transmission precoding matrices based on a performance metric;
  determine a transmission strategy based on the received report; and
  cause a transmission using at least one of the precoding matrices for each of the at least two transmission points or the joint transmission precoding matrix.

20. The apparatus according to claim 19, wherein the at least one memory including the computer program code is further configured to, with the at least one processor, cause the apparatus to determine whether at least one of multiple user multiple input multiple output or single user multiple input multiple output will be used based on the received report.

* * * * *